United States Patent [19]

Hettinger

[11] Patent Number: 5,388,043
[45] Date of Patent: Feb. 7, 1995

[54] DIET AND BEHAVIORAL CONTROL DEVICE

[76] Inventor: Catherine A. Hettinger, P.O. Box 536564, Orlando, Fla. 32853

[21] Appl. No.: 687,465

[22] Filed: Apr. 18, 1991

Related U.S. Application Data

[63] Continuation-in-part of Ser. No. 400,435, Aug. 30, 1989, Pat. No. 5,033,561.

[51] Int. Cl.$^6$ .................. G01G 19/40; G06F 15/00
[52] U.S. Cl. ........................ 364/413.29; 177/25.16
[58] Field of Search ............... 364/413.29; 177/25.16, 177/238, 25.19; 434/127

[56] References Cited

U.S. PATENT DOCUMENTS

| | | | |
|---|---|---|---|
| 4,223,750 | 9/1980 | Perego . | |
| 4,571,682 | 2/1986 | Silverman et al. . | |
| 4,731,726 | 3/1988 | Allen, III . | |
| 4,815,767 | 3/1989 | Lambert | 283/67 |
| 4,832,603 | 5/1989 | Basil | 434/127 |
| 4,911,256 | 3/1990 | Attikiouzel | 177/25.16 |
| 5,007,743 | 4/1991 | Brennan | 374/141 |
| 5,019,974 | 5/1991 | Beckors | 364/413.02 |
| 5,033,561 | 7/1991 | Hettinger | 177/25.16 |
| 5,143,405 | 9/1992 | Daneshvar | 281/31 |

OTHER PUBLICATIONS

*Patent Abstracts of Japan*, vol. 6, No. 66, p. 112, Absract No. 57-7520, Tanji et al., Jan. 14, 1982.
*Patent Abstracts of Japan*, vol. 10, No. 389, p. 531, Abstract No. 61-178659, Oda, Aug. 11, 1986.
*Patent Abstracts of Japan*, vol. 10, No. 316, p. 510, Abstract No. 61-127062, Nagayama et al., Jun. 14, 1986.
*Journal of Consulting and Clinical Psychology*, vol. 53, No. 5, 1985, Burnett et al., "Ambulatory Computer-Assisted Therapy for Obesity: A New Frontier For Behavior Therapy", pp. 698–702.
*Journal of Nutrition, Education*, vol. 17, No. 4, 1985, "Nutri-Byte Analyzer: Your Personal Calorie and Nutrition Center".
*Current Opinion in Psychiatry*, 1989, No. 2, Burnett, "Computers for Assessment and Intervention in Psychiatry and Psychology", pp. 780–786.
*Behavior Therapy*, vol. 21, 1990, Agras et al., "Developing Computer-Assisted Therapy for the Treatment of Obesity", pp. 99–109.

*Primary Examiner*—David M. Huntley

[57] ABSTRACT

This device assesses the intake of all consumed ingestible substances along with associated factors. The associated factors describe one or more environmental conditions under which ingestible substances were consumed, such as relating to behavior, emotional state, or exercise. The device comprises a mat on which the ingestible substances are placed, a weighing device attached to the mat, a memory for storing data pertaining to the ingestible substances and associated factors, an input device for entering data and an output device. Health professionals can utilize the data stored by this device to assess digestive and various health disorders and also treat these disorders. The device can further be used to assist in an individual's weight gain, weight loss or to monitor restriction of certain substances.

8 Claims, 4 Drawing Sheets

STEP 1

STEP 2

```
       D,T   D,T  D,T D,T D,T

Q?  -  A    A    A   A   A

Q?  -  A    A    A   A   A

Q?  -  A    A    A   A   A

Q?  -  A    A    A   A   A

Q?  -  A    A    A   A   A
```

DIET AND BEHAVIORAL CONTROL DEVICE

This is a continuation-in-part of Ser. No. 07/400,435 filed Aug. 30, 1989 now U.S. Pat. No. 5,033,561.

BACKGROUND OF THE INVENTION

1. Field of the Invention

The present invention relates to a diet and behavioral control device and more particularly to a new and novel device improvement whereby a person is able to monitor the consumption of food and associated factors such as those which pertain to behavioral cues. Some of these associated factors are time, behavioral information, exercise information, emotional well-being, health information, social situation and the like.

2. Prior Art

Many people are presently attempting to control their diet. In order to control any system, it is necessary to do the following measure the activity of the system, record various factors, give feedback as to the progress towards a goal and then adjust or change the system to achieve the goal. Present diet systems do not do this. Accurate measurement cannot be acheived by writing events down. Even if the type of substance is recalled, the amount consumed is unknown. Counting by any means leads to cheating and most totalyzing means are cumbersome or subject to procrastination. Americans eat out at least three times a week and it provides an excuse to get off the diet because no measurement is made of the restaurant food. When the diet requires an unpleasant-looking combersome kitchen device its easy to see why its left at home. Simple kitchen scales are therefore not used commonly for this. Besides the above disadvantages, there has been no easy-to-use way to passively record intake of food and the like along with associated factors. These associated factors provide good information regarding the reasons for the amount and kind of food consumed. These behavioral cues assist in the control of a person's diet. It is well known that emotions such as stress or depression effect the kinds and amounts of foods consumed. Factors such as exercise influence the amount of personal weight loss or gain, and are important to measure and record. There is no prior art found which passively records and/or controls intake of food and other substances, along with these associated factors.

SUMMARY OF THE INVENTION

The principal object of the present invention is to provide a novel device using a unique method to assess the intake of all nutritive substances along with associated factors in an unobtrusive, utilitarian, and easy-to-use way.

Another object is to utilize this method incorporating this device to provide a means for behavioral feedback to assist and provide a means for an individual's weight loss, weight gain, or fulfillment of special diet restrictions.

A further object of the present invention is to serve as a useful tool for health professionals to assess nutritive intake and to provide a means to diagnose and treat various health disorders.

The foregoing objects and others that are apparent are achieved through the use of a weight control mat. The user of this method of control decides that everything which is consumed must be placed on the placemat. Once this decision is made it can then passively record-all intake. It is a well known theory that control can better be attained when good measurement is being made. Feedback is also important and with this method the desired factors conducive to control such as but not limited to amounts of food groups, calories, time, behavioral information, emotional well-being, health information, social situation and the like can be chosen as feedback information to the individual or supressed and instead only used to inform a health professional.

The preferred embodiment has a surface divided into food groups. Each food is placed on the placemat in sequence and zeroed between dishes. The amount of each food group is then stored in each register. Additional information regarding the food such as calories per gram can be recorded as total amounts in a register. Leftovers are subtracted from these totals providing measurement. Printing means are optional to provide a written record. Otherwise selected totals are read periodically (i.e. daily) and noted.

The features and advantages of the present invention will become apparent from the following detailed description of the invention when read with the accompanying drawings.

DETAILED DESCRIPTION OF PREFERRED EMBODIMENT

Figure 1:
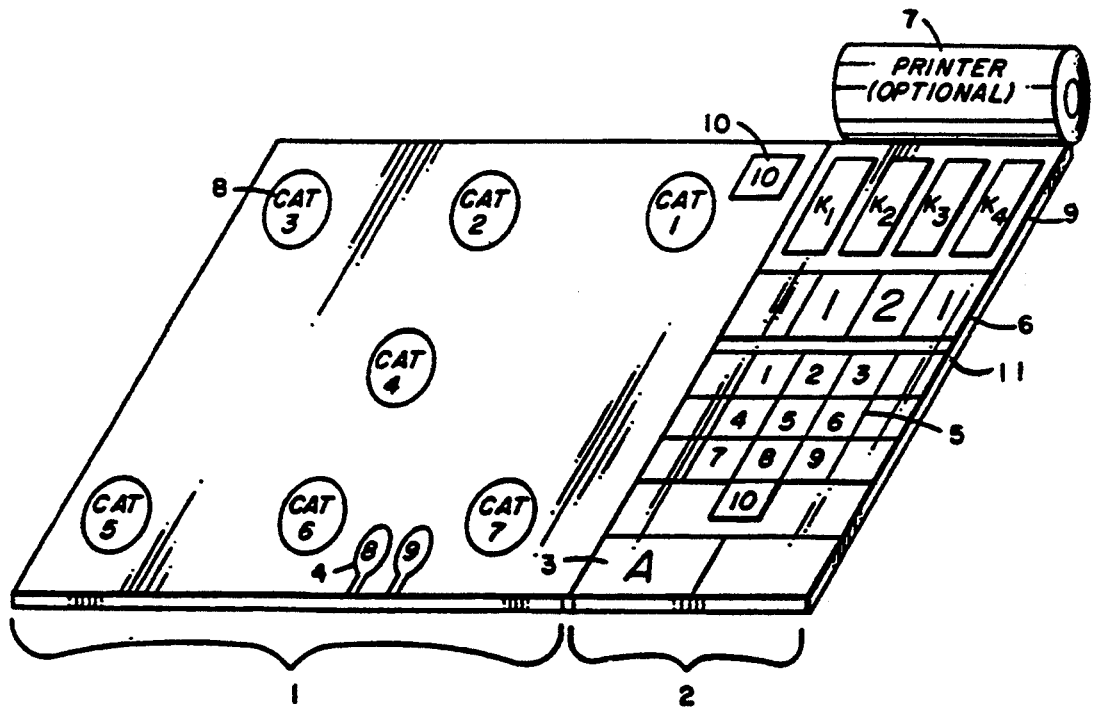
FIG. 1 is the most preferred embodiment of the weight control placemat of the present invention.

Referring specifically to FIG. 1, there is illustrated the most preferred embodiment of the weight control placemat. This invention includes a placemat, 1, of sufficient size to hold all contents of a meal. It is a device composed of a measuring method using an electronic strain gauge scale which transmits an electronic signal. This is then recorded in unit, 2, an electronic device, along with any other factors. The unit is turned on and zeroed through, 3, and category, 8, is entered using the keys, 5. The keys, 9, allow entering of the weight data along with optional information which may include but not limited to calories, fat, salt, cholesteral and the like. Information counting number of glasses of water, beverage, or drug as in, 10, is also entered. Condiments, 4, are entered also. Additional information such as but not limited to time, exercise information, emotional well-being and the like can also be entered through, 5, and keys, 9. A display, 6, and an optional printer, 7, are available for reading or recording. An optional RS-232 connection, 11, is provided to allow connection as a hookup to a computer for periodic or continual exchange of information. Information stored in the unit can be sent to the computer and guides from the computer can be sent to the diet and behavioral control device.

Figure 2:
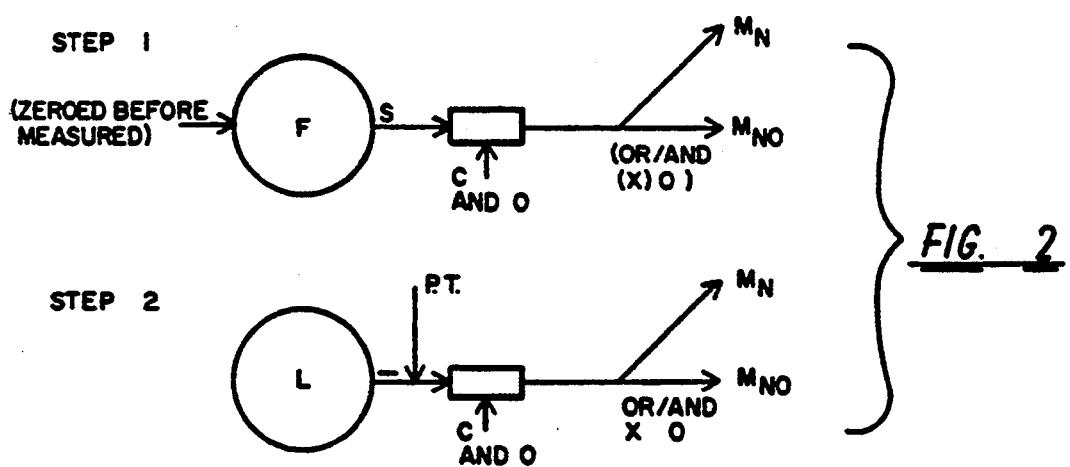
FIG. 2 is a flowchart of the use of this embodiment.

Referring now to FIG. 2 we can see the flow of information and operation of this invention. Food F is placed on the placemat. Signal S is transmitted and additional factors C (Calories per gram) and O (optional factors such as fats, cholesterol, salt, sugar and the like) are sent to register Mn (totaling amount) and Mno (amount multiplied by O optional factors). In Step 2 of FIG. 2 the leftovers including plates, utensils, etc., L, are measured and subtracted from the previous total P.T. each time a dish is removed. It is then entered into the appropriate register including or not including the optional information Mno or Mn.

Figure 3:
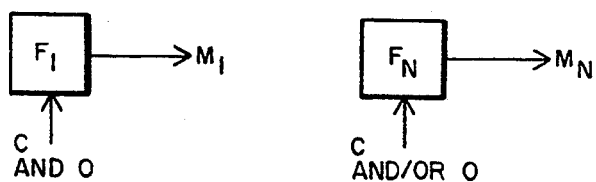
FIG. 3 is an illustration of the use of a second embodiment which appears identical to FIG. 1 but the category areas are each weighed separately using individual scales.
Figure 3:
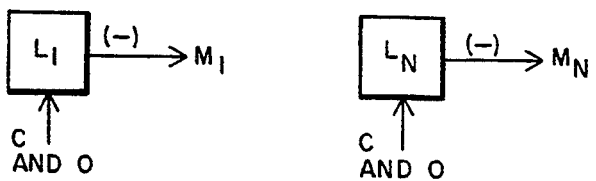

An alternate embodiment of this design is FIG. 3. Its appearance is the same as FIG. 1 but the categories operate seporately. Instead of one weighing mechanism individual mechanisms which are electronic scales are used for each category. In step 1 the first item, F1, is measured along with any factors, C, and O, and placed in register M1. This can be done by entering or automatically. Additional items are measured individually, Fn, and the amounts placed in registers, Mn. In step 2 the leftovers for L1 and Ln are subtracted from the amounts in memory M1 and Mn.

Figure 4:
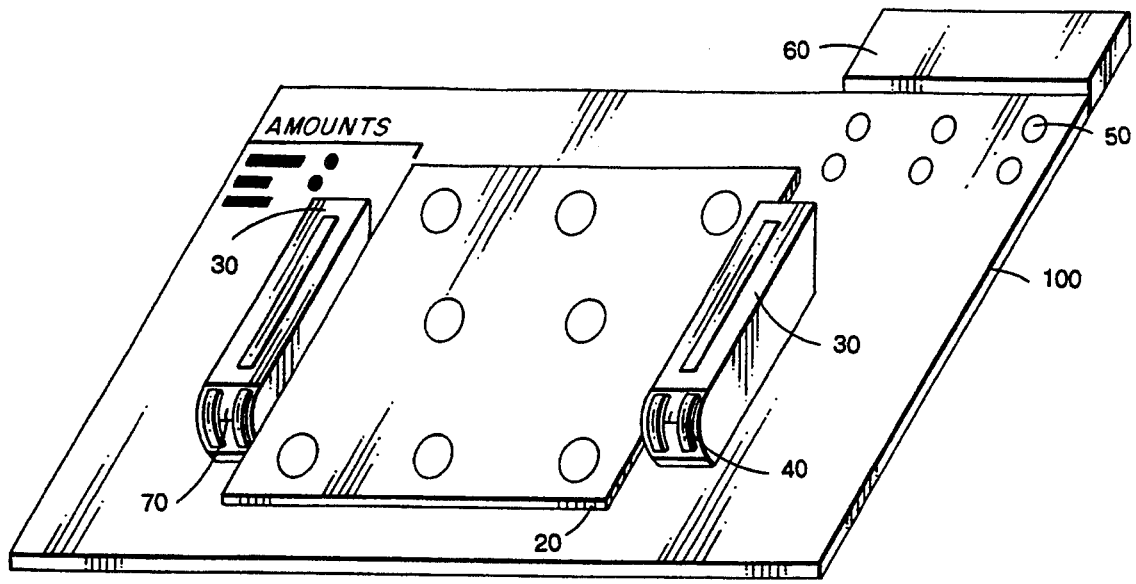
FIG. 4 is an alternate embodiment showing a mechanical way to design the weight control placemat of the present invention.

Referring to FIG. 4 there is another preferred embodiment which uses an alternate method of recording and control. It also is a weight control placemat comprising two panels 100 and 20 and opposite weighing mechanisms 30 supporting Panel 20. Lengths of paper 40 placed on 30 are marked off using a pen or marker or cut using a stylus or scissors or torn with the fingers according to the travel of the pointer 70 on 30. This travel represents the addition of each dish of food. Upon completion of the meal the paper can be decreased in size by marking, cutting, or tearing according to the amount of leftovers and the weight of containers. Disks 50 are used to measure the amount of condiments, beverages if desired, pills etc. A record for each meal is easily placed in food diary 60 using the cut, torn, or marked tapes 40 and disks 50. The panel 100 can also be used as a visual method which graphically shows the length of tape corresponding to the amount of each food or food group to continually assess the amount of consumption of food and the like. Additional information such as time of day, emotional well being, behavioral information, exercise information, social situation and the like can either be written or coded as a sticker and placed on a placemat and/or kept in the diary to be used for the use of the user or healthcare professional to assess eating habits and behavioral information.

Figures 5, 6:
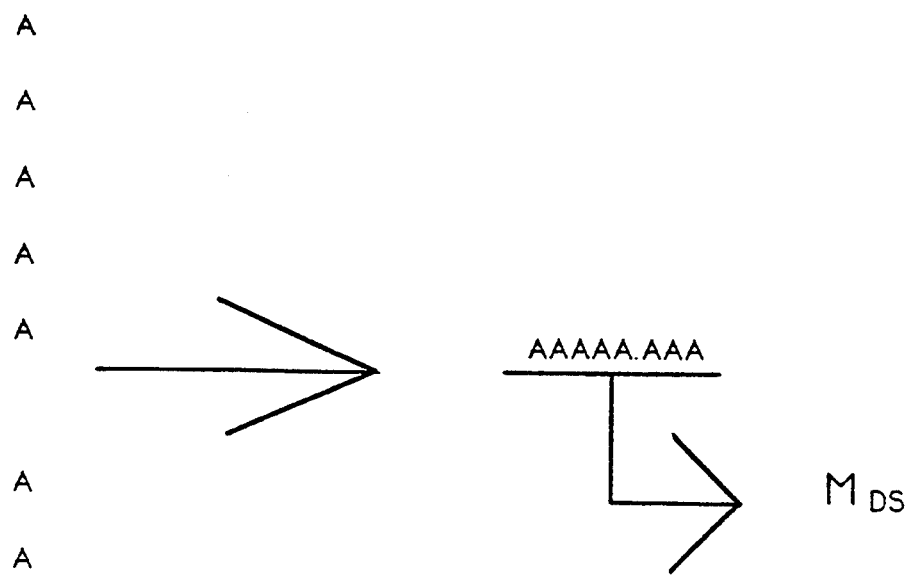
FIG. 5 is a flowchart defining the input of behavioral information into the placemat of FIG. 1.
FIG. 6 is an alternate method which is shown as a flowchart of the input of behavioral information into the placement of FIG. 1.

Referring now to FIG. 5 we can see the flow of information and operation of the addition of various associated factors. The number of the day, D, and the order of snack or meal in the day, S, serve as the number of the storage register. Various questions such as, "How happy are you now?" are answered on a scale of 1 to 9 and are designated as various answers A. The questions are answered in order with 0 for any not relevant. This eight digit number AAAAA.AAA is then stored in the storage register DS. The designations of input keys are numeric, symbolic, or with written letters or words. The questions can include time, behavioral information, exercise information, emotional well-being, health information, social situation and the like.

Referring now to FIG. 6 there is represented an alternate method of input of various factors. Question (Q) are answered from a menu and placed in an array according to the day and time (D and T).

Figure 7:
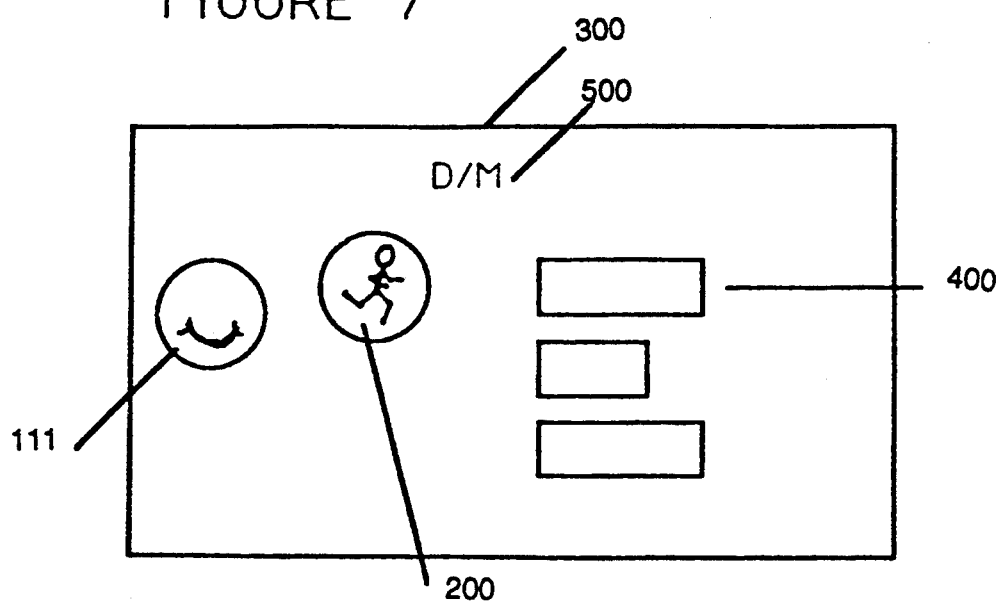
FIG. 7 is a drawing of the diet diary used along with FIG. 4 embodiment which shows the recording of diet and behavioral information.

Referring now to FIG. 7 we can see the design of stickers used to code various optional information. Emotional well-being, in this case a measure of representations varying from happiness to sadness is represented as a sticker, 111, and an exercise sticker is added, 200. This is transferred to a spot on the diary which is according to the day of the week, 300, and the order of the meal, 500. The information on the amounts of food, 400, are placed in the same area.

While preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

I claim:

1. An electronic diet and behavioral recording device comprising:
    a mat on which ingestible substances are placed in preparation for eating by a user;
    weighing means, attached to said mat, for weighing ingestible substances placed on said mat, said weighing means includes means for recording the weight of different categories of ingestible substances placed at respective different locations on the surface of said mat;
    input means, attached to said mat, for entering data representing associated factors, said associated factors describing one or more environmental conditions under which ingestible substances placed on the weighing means were consumed;
    memory means for storing the category of ingestible substance consumed, the weight of the ingestible substances consumed and associated factors input by said input means;
    output means, attached to said memory means, for outputting said stored data,
    wherein the data output by said output means identifies the environmental conditions associated with the consumption of ingestible substances, said output data serving as an aid in behavioral modification.

2. The diet and behavioral recording device in accordance with claim 1, wherein the associated factors include, but are not limited to, the following environmental conditions: time at which ingestible substances were consumed, emotional state while ingestible substances were consumed, surrounding social situation while ingestible substances were consumed, and amount of exercise prior to the consumption of ingestible substances.

3. The diet and behavioral recording device in accordance with claim 1, wherein the output means is a visual display attached to said place mat.

4. The diet and behavioral recording device in accordance with claim 1, wherein the output means is a serial interface for transmitting the data stored in the memory means to a remote computer.

5. The diet and behavioral recording device in accordance with claim 1, wherein the output means is a printer attached to said place mat.

6. The diet and behavioral recording device in accordance with claim 1, in which the associated factor data is entered in response to a menu presented to said user concerning said one or more environmental conditions under which ingestible substances placed on the weighing means were consumed.

7. The diet and behavioral recording device in accordance with claim 6, in which the menu is answered by inputting a number on a numeric scale of 1 to n, where n is some number other than 1.

8. The diet and behavioral recording device in accordance with claim 1, in which the input means is a keyboard.

* * * * *